(12) United States Patent
Kasahara et al.

(10) Patent No.: US 7,341,704 B2
(45) Date of Patent: *Mar. 11, 2008

(54) SURFACE-TREATED CALCIUM CARBONATE, METHOD FOR PRODUCTION THEREOF AND RESIN COMPOSITION COMPRISING SAID CALCIUM CARBONATE

(75) Inventors: Hidemitsu Kasahara, Hyogo (JP); Yuusuke Hayashi, Hyogo (JP); Yoichi Takahashi, Hyogo (JP); Seiya Shimizu, Hyogo (JP); Shigeo Takiyama, Hyogo (JP); Katsunori Fukumoto, Hyogo (JP)

(73) Assignee: Maruo Calcium Company Limited, Akashi-shi (JP)

( * ) Notice: Subject to any disclaimer, the term of this patent is extended or adjusted under 35 U.S.C. 154(b) by 445 days.

This patent is subject to a terminal disclaimer.

(21) Appl. No.: 10/468,156

(22) PCT Filed: Nov. 1, 2002

(86) PCT No.: PCT/JP02/11475

§ 371 (c)(1),
(2), (4) Date: Aug. 27, 2003

(87) PCT Pub. No.: WO03/042103

PCT Pub. Date: May 22, 2003

(65) Prior Publication Data

US 2004/0092639 A1    May 13, 2004

(30) Foreign Application Priority Data

Nov. 16, 2001 (JP) ............................. 2001-351149
Jul. 25, 2002 (JP) ............................. 2002-216217

(51) Int. Cl.
*C01B 31/24* (2006.01)

(52) U.S. Cl. .................. 423/419.1; 423/430; 524/322; 524/425

(58) Field of Classification Search ............. 423/419.1, 423/430; 524/322, 425
See application file for complete search history.

(56) References Cited

U.S. PATENT DOCUMENTS 6,682,775 B2 *    1/2004    Calhoun et al. ............ 427/215

FOREIGN PATENT DOCUMENTS

| JP | 11-268912 | 10/1999 |
|---|---|---|
| JP | 11-349846 | 12/1999 |
| JP | 2001-072413 | 3/2001 |
| JP | 2002-220547 | 8/2002 |
| JP | 2002-235015 | 8/2002 |

* cited by examiner

*Primary Examiner*—Peter D. Mulcahy
(74) *Attorney, Agent, or Firm*—Kratz, Quintos, & Hanson, LLP

(57) ABSTRACT

The surface-treated calcium carbonate is disclosed which is surface-treated with an organic surface treating agent, said surface-treated calcium carbonate satisfies the particular BET specific surface area (Sw), reduced heat amount per unit specific surface area (As), average pore diameter (Dxp) at which an increased amount of mercury penetration reaches the maximum value in a method of mercury penetration, and amount of an average pore diameter [maximum value of an increased amount of mercury penetration (Dyp)/average pore diameter (Dxp)]. The surface-treated calcium carbonate of the present invention is particularly useful for resins and it not only improves adhesion of resin compositions to a subject to be adhered, but forms a rigid coating film when blended into resins.

16 Claims, No Drawings

SURFACE-TREATED CALCIUM CARBONATE, METHOD FOR PRODUCTION THEREOF AND RESIN COMPOSITION COMPRISING SAID CALCIUM CARBONATE

TECHNICAL FIELD

The present invention relates to a surface-treated calcium carbonate that has been treated with an organic surface treating agent a method for producing the surface-treated calcium carbonate and a resin composition containing the surface-treated calcium carbonate. To be more specific, the present invention relates to a surface-treated calcium carbonate that has been treated with an organic surface treating agent, the surface-treated calcium carbonate providing a resin composition exhibiting viscosity/thixotropy imparting effects and excellent joint conformability when used for curable-type resins represented by, for example, sealants and adhesives, as well as a resin composition realizing a coating film not only having high luster, high thixotropy and anti-sagging property, but also having high strength when blended in, for example, paints, inks and plastisols, and to a method of producing the surface-treated calcium carbonate and a resin composition containing the surface-treated calcium carbonate.

BACKGROUND ART

Calcium carbonate is widely used as fillers or pigments for plastics, paints, inks, sealants, adhesives, papers, rubbers and the like. For example, as for the sealants, sealants are widely used for the purpose of realizing waterproofing and sealing in the fields of construction, automobile production, floor materials and the like. For use in these fields, sealants are often applied to vertical regions, so that it is required for the sealants not to sag down during the process from application to curing but to have high viscosity and high thixotropy.

In order to solve the above-mentioned problem, inventors of the present invention have already proposed a method for producing a precipitated calcium carbonate (Japanese Unexamined Patent Publication JP-A 10-72215), however, in association with further increase in demand, requests for physical properties are getting higher.

For example, in construction of personal houses, demand for siding boards is dramatically increasing. For such siding boards, sealants of low modulus are used in consideration of repetition of drying and wetting, and movement of members. Since the siding boards expand and contract under the influence of temperature and humidity, it is necessary for the sealants to have joint conformability. In order to impart these features, colloidal calcium carbonate has been used heretofore, whereby the modulus after curing is reduced and conformability to the subject of application can be improved to some extent and fine adjustment of viscosity is enabled. However, for further adjusting the viscosity based on reduction in modulus and addition of trace amount, there is a limitation by way of the conventional colloidal calcium carbonate, and hence those having higher fineness and higher dispersibility are desired.

For paints and inks, colloidal calcium carbonate has been traditionally used. As for paints, a warranty period such as 10-year warranty has been presented in recent years, so that paints having higher durability are requested. Also as for inks, there has been a conventional problem that transparency of the ink lowers due to a difference in refractive index between calcium carbonate and ink vehicle, so that it is requested to reduce the conventional blending amount of the colloidal calcium carbonate while maintaining characteristics of the inks.

Also in plastics, wollastonite or needle-shaped calcium carbonate has been used for preventing the strength of a weld line of a shaped article obtained by an injection molding machine from deteriorating, however, both of them have relatively large particle sizes such as several tens microns to 200 microns, which may raise a problem of inducing a decrease in impact strength. With conventional colloidal calcium carbonate, it was difficult to prevent the strength of a weld line portion from deteriorating, and impact strength from decreasing.

Furthermore, in plastisols, vinyl chloride resins are often used in particular for automobile bodies, however, in recent years, consideration has been made to use acrylic resin as alternatives from the environmental aspect. In particular, in acrylic resins, consideration has been made to reduce a film thickness from the view point of reduction of weight as well as from the view point of cost advantage over vinyl chloride resins, and hence fillers capable of imparting higher viscosity even though the amount of addition is small has been demanded. However, conventional colloidal calcium carbonate could not satisfy this demand.

In light of the circumstances as described above, the present invention provides a surface-treated calcium carbonate that has been treated with an organic surface treating agent, a method for producing the same, and a resin composition containing the same, said surface-treated calcium carbonate having joint conformability as well as viscosity/thixotropy imparting effect when used in, for example, curable resins represented by sealants and adhesives; having high luster, excellent anti-sagging property and high strength of a coating film when used in, for example, paints, inks and plastisols; preventing strength of a weld line surface from deteriorating when used in, for examples, plastics, and said surface-treated calcium carbonate also being capable of providing a resin composition having excellent impact strength and reducing weight by decreasing the adding amount into the resin.

As a result of an extensive series of studies for solving the problems as described above, the inventors of the present invention have found that by performing carbonation reaction while adding a specific substance followed by maturation at a specific concentration, a precipitated calcium carbonate having a specific fineness and excellent dispersibility is obtained; and the calcium carbonate surface-treated with a specific amount of an organic surface treating agent has a specific particle size characteristic and improves the adhesion against the subject to be applied and improves the strength of a coating film to be formed, so that the above problems can be solved, and have thus completed the present invention.

DISCLOSURE OF THE INVENTION

That is, the first aspect of the present invention is directed to a surface-treated calcium carbonate that is treated with an organic surface treating agent, wherein the surface-treated calcium carbonate satisfies the following formulae (a), (b), (c) and (d):

$$20 \leq Sw \leq 200 \ (m^2/g) \tag{a}$$

$$1.0 \leq As \leq 7.5 \ (mg/m^2) \tag{b}$$

$$0.003 \leq Dxp \leq 0.03 \ (\mu m) \tag{c}$$

$$50 \leq Dyp/Dxp \leq 180, \tag{d}$$

wherein:

Sw: BET specific surface area determined by nitrogen adsorption method (m$^2$/g);

As: reduced heat amount per unit specific surface area calculated by the following equation (mg/m$^2$):

(reduced heat amount mg per 1 g of the surface-treated calcium carbonate at 200° C. to 500° C.)/Sw;

Dxp: average pore diameter (μm) at which an increased amount of mercury penetration (integration of increased amounts of pore volume/log average pore diameter) reaches the maximum value (Dyp) in distribution of pore in the pore range of 0.001 to 0.1 μm in a method of mercury penetration;

Dyp: maximum value of an increased amount of mercury penetration (ml/g); and

Dyp/Dxp: amount of an average pore diameter.

The second aspect of the present invention is directed to a surface-treated calcium, carbonate that has been treated with an organic surface treating agent, wherein the surface-treated calcium carbonate satisfies the following formulae (a), (b), (e) and (f):

$20 \leq Sw \leq 200$ (m$^2$/g)  (a)

$1.0 \leq As \leq 7.5$ (mg/m$^2$)  (b)

$0.03 \leq Dxs \leq 1$ (μm)  (e)

$Dys \leq 30$ (% by weight),  (f)

wherein:

Sw: BET specific surface area determined by nitrogen adsorption method (m$^2$/g);

As: reduced heat amount per unit specific surface area calculated by the following equation (mg/m$^2$):

(reduced heat amount mg per 1 g of the surface-treated calcium carbonate at 200° C. to 500° C.)/Sw;

Dxs: average particle size (μm) at 50% accumulated weight from a larger particle side in particle size distribution measured by a laser diffraction system (manufactured by Shimadzu Corp.: SALD-2000); and Dys: accumulated weight of particle sizes of more than 3 μm in the above particle size distribution (% by weight).

The third aspect of the present invention is directed to a surface-treated calcium carbonate that is treated with an organic surface treating agent, wherein the surface-treated calcium carbonate satisfies the following formulae (a), (b), (c), (d), (e) and (f):

$20 \leq Sw \leq 200$ (m$^2$/g)  (a)

$1.0 \leq As \leq 7.5$ (mg/m$^2$)  (b)

$0.003 \leq Dxp \leq 0.03$ (μm)  (c)

$50 \leq Dyp/Dxp \leq 180$,  (d)

$0.03 \leq Dxs \leq 1$ (μm)  (e)

$Dys \leq 30$ (% by weight),  (f)

wherein:

Sw: BET specific surface area determined by nitrogen adsorption method (m$^2$/g);

As: reduced heat amount per unit specific surface area calculated by the following equation (mg/m$^2$):

(reduced heat amount mg per 1 g of the surface-treated calcium carbonate at 200° C. to 500° C.)/Sw;

Dxp: average pore diameter (μm) at which an increased amount of mercury penetration [integration of increased amounts of pore volume/log (average pore diameter)] reaches the maximum value (Dyp) in distribution of pore in the pore range of 0.001 to 0.1 μm in a method of mercury penetration;

Dyp: maximum value of an increased amount of mercury penetration (ml/g); and

Dyp/Dxp: amount of an average pore diameter.

Dxs: average particle size (μm) at 50% accumulated weight from a larger particle side in particle size distribution measured by a laser diffraction system (manufactured by Shimadzu Corp.: SALD-2000); and Dys: accumulated weight of particle sizes of more than 3 μm in the above particle size distribution (% by weight).

The fourth aspect of the present invention is directed to a method for producing a surface-treated calcium carbonate comprising the steps of:

adding 0.5 to 15% by weight of a substance which coordinates with a metal ion to form a complex into a slurry of calcium hydroxide;

blowing-in carbon dioxide gas to synthesize calcium carbonate by carbonation reaction;

adjusting a concentration of the calcium carbonate to 2.4 to 13.0% by weight to conduct maturation; and surface-treating the calcium carbonate thus obtained with an organic surface treating agent.

The fifth aspect of the present invention is directed to a resin composition comprising a resin and the surface-treated calcium carbonate as recited above.

BEST MODE FOR CARRYING OUT THE INVENTION

The formula (a) defines a range of BET specific surface area determined by a nitrogen adsorption method for a surface-treated calcium carbonate of the present invention, and it is necessary to be in the range of 20 to 200 m$^2$/g. If the specific surface area is less than 20 m$^2$/g, imparting of high viscosity which is an object of the present invention is difficult. On the other hand, if the specific surface area is more than 200 m$^2$/g, stability with the lapse of time is poor and a problem regarding dispersibility occurs, though it is preferred because the number of primary particles is very small. Accordingly, it is preferably in the range of 30 to 150 m$^2$/g and more preferably in the range of 40 to 120 m$^2$/g.

By the way, for measuring the BET specific surface area, NOVA2000 type apparatus available from Yuasa Ionics Inc. was used.

The formula (b) defines an amount of an organic surface treating agent per unit specific surface area of the surface-treated calcium carbonate according to the present invention, and the amount of the organic surface treating agent per unit specific surface area "As" is necessary to be in the range of 1.0 to 7.5 mg/m$^2$. Conventionally, several kinds of calcium carbonate wherein primary particles are so small as to satisfy the formula (a) are commercially available, however, in such kinds of calcium carbonate, secondary particles which are formed by aggregation of primary particles further aggregate to form tertiary particles. Therefore, even though the amount of the surface treating agent of less than 1.0 mg/m$^2$ is sufficient for the amount of surface treating agent which covers the calcium carbonate, the amount of formed tertiary particles in the present calcium carbonate is smaller than that of the conventional calcium carbonate, and the dispersibility of secondary particles is extremely high, so that it is difficult to sufficiently cover the surface by the above amount of treating agent. If drying and powderization are conducted in shortage of the treating agent, untreated surfaces form tertiary aggregates, disabling a satisfactory effect of the surface-treated calcium carbonate. On the other hand, if the amount of the treating agent is more than 7.5 mg/m², the surface treating agent separates into a resin component or a plasticized component due to an excess of the surface treating agent, to cause the bleeding phenomenon, the surface roughing phenomenon and the like. Accordingly, it is preferably 1.5 to 5.0 mg/m² and more preferably 2.0 to 4.0 mg/m².

The reduced heat amount per unit specific surface area was determined using TG-8110 manufactured by RIGAKU Co., Ltd., in the manner as follows: weighing about 100 mg of surface-treated calcium carbonate in a sample pan (made from platinum) having a diameter of 10 mm, measuring a reduced heat amount from 200 to 500° C. at a temperature rising speed of 15° C./min., determining a rate of reduced heat amount per 1 g of the surface-treated calcium carbonate (mg/g), and dividing the rate thus obtained by BET specific surface value.

The formulae (c) and (d) serve as indexes for knowing the dispersion state of the surface-treated calcium carbonate according to the present invention.

The formula (c) defines an average pore diameter (Dxp) at which an increased amount of mercury penetration reaches the maximum value (Dyp) in the pore distribution in the range of 0.001 to 0.1 μm measured by a method of mercury penetration(porosimeter), and means fineness of a clearance between particles of the surface-treated calcium carbonate.

Accordingly, this does not mean the fineness of particles shown by the (nitrogen) gas adsorption method of the formula (a), but means an average diameter between primary particles, and is necessary to be in the range of 0.003 to 0.03 μm. If the average pore diameter is less than 0.003 μm, the primary particles or the secondary particles are too fine and cause a problem in stability with the lapse of time. On the other hand, if the average pore diameter is more than 0.03 μm, the primary particles are too large or a large amount of secondary particles formed by strong aggregation of primary particles exist as described above, so that high viscosity which is an object of the present invention cannot be achieved. Therefore, it is preferably in the range of 0.005 to 0.025 μm, and more preferably in the range of 0.006 to 0.020 μm.

Meanwhile, "increased amount of mercury penetration" means an increased amount of pore volume, and is represented by the calculation formula of [integration of an increased amount of pore volume/log (average pore diameter)] (the unit is ml/g). It goes without saying that the maximum increased amount of mercury penetration (Dyp) depends on a pore diameter because the smaller the pore diameter, the smaller the pore volume becomes.

The formula (d) means the number of average pore diameter in the formula (c) indicating high viscosity which is an object of the present invention. As described above, since the pore volume becomes smaller as the pore diameter decreases, by taking the maximum increased amount of mercury penetration (Dyp) and the average pore diameter (Dxp) in the formula (c) into consideration, it is possible to induce the amount (number) of pore diameter which is necessary for the present invention. The higher Dyp/Dxp is, the higher viscosity. Therefore, it is necessary that the average pore diameter amount (Dyp/Dxp) of the present invention is in the range of 50 to 180. If Dyp/Dxp is less than 50, since the average pore diameter amount is too small, problems such as uniformity and dispersibility of particles arise so that high viscosity which is an object of the present invention cannot be achieved. On the other hand, if Dyp/Dxp is more than 180, the average pore diameter amount is extremely large so that a problem arises in stability of the primary particles and the secondary particles with the lapse of time. Accordingly, Dyp/Dxp is preferably in the range of 60 to 150 and more preferably in the range of 70 to 130.

When the surface-treated calcium carbonate according to the present invention does not satisfy the ranges of the formulae (c) and (d), for example, the luster is deteriorated in a paint composition blended with the calcium carbonate, and the breaking strength decreases in a sealant composition.

A mercury penetration apparatus (porosimeter) and principal measuring conditions used in the present invention are shown below:

<Measurement Apparatus>
Type 9520 manufactured by Shimadzu Corp.
<Principal Measuring Conditions>
Purity of mercury: 99.99%
Surface tension of mercury: 480 (dyns/cm)
Contact angle of mercury: 135°
Cell constant=10.79 (μL/pF)
Sample weight: about 0.10 g each for measurement
The surface-treated calcium carbonate according to the present invention may satisfy the following formulae (e) to (f), and preferably satisfies the following formulae (e) to (f) as well as the above formulae (a) to (d) as described above.

$$0.03 \leq Dxs \leq 1 \ (\mu m) \qquad (e)$$

$$Dys \leq 30 \ (\% \text{ by weight}) \qquad (f)$$

Wherein:
Dxs: average particle size (μm) at 50% accumulated weight from a larger particle side in particle size distribution measured by a laser diffraction system (manufactured by Shimadzu Corp.: SALD-2000); and
Dys: accumulated weight of particle sizes of more than 3 μm in the above particle size distribution (% by weight).

The formulae (e) and (f) become, for example, indexes for knowing dispersion state in a resin composition. Therefore, involving these formulae as factors forms a preferred embodiment.

The distribution of particle size is determined in the following manner: weighing ingredients (I) and (II) described below in a 140 ml mayonnaise bottle and stirring the same until the ingredients have dispersed, as observed by eyes, by the use of a stainless spoon, diluting the resultant dispersion with an ingredient (III) and preliminary dispersing the same by means of a ultra-sonic dispersing machine, and measuring a sample of the resultant dispersion by a laser diffraction type particle size distribution analyzer (manufactured by Shimadzu Corp. SALD-2000).

| | |
|---|---|
| (I) Neutral detergent (diluted 5 times with water) | 2.0 g |
| (II) Calcium carbonate sample | 0.4 g |
| (III) Water | 40 g |

In particular, ultra-sonic dispersion used as a preliminary dispersion after preparing the dispersion containing the above ingredients as a pretreatment, is preferably carried out in a constant condition, and the ultra-sonic disperser used in the examples of the present invention was used to carry out preliminary dispersion in a constant condition of 100 μA for 60 seconds, using a US-300T disperser (manufactured by Nippon Seiki Co., Ltd.). Also, the neutral detergent is not particularly limited and any generally available products can be used without any problem. In the present invention, "MAMALEMON" (Registered Trademark available from Lion Corporation) was used.

In the measuring method of particle size distribution as described above, when the average particle size (Dxs) of the present invention is less than 0.03 μm, there is a case that the stability with the lapse of time of the primary or secondary particles deteriorates. On the other hand, when it is more than 1 μm, the tertiary particles tend to increase as described above, and hence dispersibility in the resin composition tends to become poor. Accordingly, it is more preferably in the range of 0.05 to 0.8 μm and still more preferably in the range of 0.08 to 0.5 μm.

Also, when the accumulated weight of average particle diameter of more than 3 μm (Dys) is more than 30% by weight, dispersion state in the resin composition cannot be said to be sufficient, and it is difficult to achieve the desired high viscosity. Accordingly, it is more preferably not more than 25% by weight and most preferably not more than 20% by weight.

In the case where the calcium carbonate according to the present invention does not satisfy the ranges of the above formulae (e) and (f), for example, the luster decreases in a paint composition blended with the calcium carbonate, and the breaking strength is likely to decrease in a sealant composition.

Preferably, the surface-treated-calcium carbonate according to the present invention further satisfies the following formulae (g) to (j). These formulae define preferred ranges for the aforementioned formulae (c), (d), (e) and (f) respectively.

$$0.005 \leq Dxp \leq 0.025 \ (\mu m) \quad (g)$$

$$60 \leq Dyp/Dxp \leq 150, \quad (h)$$

$$0.05 \leq Dxs \leq 0.8 \ (\mu m) \quad (i)$$

$$Dys \leq 25 \ (\% \ by \ weight) \quad (j)$$

Preferably, the surface-treated calcium carbonate according to the present invention further satisfies the following formula (k).

$$0.1 \leq Sw \cdot Dxp \leq 1.5 \quad (k)$$

The formula (k) defines a value obtained by multiplying BET specific surface area value (Sw) representing fineness of primary particles of the surface-treated calcium carbonate and average pore diameter (Dxp) representing fineness of secondary particles. The primary particles and secondary particles are already defined individually by the formulae (a) to (j), however, combined involvement as shown in the formula (k) rather than independent involvement is preferred since the desired physical property of viscosity is easily obtained. When "Sw·Dxp" in the formula (k) is less than 0.1, there is a case that the stability with the lapse of time of primary or secondary particles deteriorates. On the other hand, when it is more than 1.5, there is a tendency that the number of formed tertiary particles increases as described above. Accordingly, it is more preferably in the range of 0.3 to 1.2, and still more preferably in the range of 0.5 to 1.0.

Preferably, the surface-treated calcium carbonate according to the present invention further satisfies the following formula (l).

$$0.03 \leq Is \leq 3 \ (\mu mol/m^2) \quad (l)$$

wherein:

Is: content of alkali metal per unit specific surface area calculated by the following formula:

$$\{\text{metal content per 1 g of calcium carbonate } (\mu mol/g)\}/Sw \ (m^2/g)$$

The formula (l) represents alkali metal content in the surface-treated calcium carbonate, and a preferred range is usually 0.03 to 3 mmol/m². Since alkali metal compounds, in particular, sodium compounds have high exothermic reactivity and hence are easy to react with moisture outside the system, if a sodium compound exists in an amount exceeding 3 μmol/m² in the calcium carbonate, a problem may occur in storage stability such as dispersion: insufficiency or the like particularly in application of sealing materials. For making the alkali metal content in the level of 0.03 μmol/m² or less than 0.03 μmol/m², it is necessary to (1) reduce the amount of a surface treating agent to an extremely small amount, (2) excessively carry out water washing after surface treatment, or (3) use acids such as fatty acids or resin acids as a surface treating agent. In the case where (1) is employed, inferiority in physical properties as described above is likely to occur, and in the case where (2) is employed, the cost rises because plenty of water is required. Also in the case where (3) is employed, not only the cost increases because the surface treatment is carried out at a temperature higher than the melting point, but also choice of the surface treating agent is restricted. Accordingly, the alkali metal content is more preferably in the range of 0.15 to 2 μmol/m² and still more preferably in the range of 0.3 to 1.5 μmol/m².

As a further preferred embodiment, it is preferred that in a calcium carbonate slurry before carrying out the surface treatment, behaviors of the slurry satisfy the following formula (m).

$$0.03 \leq Dx \leq 0.40 \quad (m)$$

wherein:

Dx: particle size (μm) at 50% accumulated weight calculated from a larger particle size in particle size distribution measured by a centrifugal-type particle size distribution analyzer (manufactured by Shimadzu Corp. SA-CP4).

The formula (m) represents an average particle size of secondary particles before carrying out surface treatment of the surface-treated calcium carbonate according to the present invention, wherein an index of the particle size distribution which is numerically clear is taken into consideration. The surface-treated calcium carbonate according to the present invention which satisfies the formula (m) can securely impart high viscosity which is an object of the present invention. Therefore, when Dx is less than 0.03, a problem is likely to occur in stability with the lapse of time and dispersibility of the primary particles of the calcium carbonate. On the other hand, when it is over 0.04 μm, since the ratio of formed tertiary particles increases as described above, it is difficult to impart high viscosity which is an object of the present invention in the surface-treated calcium carbonate. Therefore, it is more preferably in the range of 0.07 to 0.35 μm, and still more preferably in the range of 0.10 to 0.30 μm.

As to the shape of primary particle of the calcium carbonate, any shapes such as, not limited thereto, spherical, spindle, needle, massive, chain (necklace) shapes are available. Among these, a chain shape is preferred for providing strength to a resin as well as for imparting high viscosity.

As yet preferred embodiment, it is preferred that the surface-treated calcium carbonate according to the present invention satisfies the following formulae.

$$VIS2 \geq 400 \text{ (Pa·s)} \quad (n)$$

$$VIS20 \geq 80 \text{ (Pa·s)} \quad (o)$$

$$VIS2/VIS20 \geq 5.0 \quad (p)$$

wherein:

VIS2: viscosity (Pa·s) of a mixed paste of diisononyl phthalate (DINP) and surface-treated calcium carbonate, measured at 2 rpm of BH-type viscosimeter, VIS20: viscosity (Pa·s) of the above mixed paste at 20 rpm.

The formulae (n) to (p) represent viscosity behaviors, in a resin component, of the surface-treated calcium carbonate according to the present invention. The method for preparing the mixed paste of DINP and the calcium carbonate is as follows.

| | |
|---|---|
| Calcium carbonate sample | 50 parts by weight |
| DINP | 30 parts by weight |
| DINP | 30 parts by weight (additional) |
| DINP | 30 parts by weight (additional) |

(1) Weigh 30 g of DINP in a 1 L paper cup, and then weigh 50 g of calcium carbonate. Set the paper cup on a planetary mixer KK-502N (manufactured by KURABO), and knead at a rotation of 765 rpm and a revolution of 765 rpm for 60 seconds, followed by manual stirring with a stainless spoon and subsequent kneading for 180 seconds.

(2) Add 30 g of DINP to the cup, knead at a rotation of 765 rpm and a revolution of 765 rpm for 60 seconds, followed by manual stirring with a stainless spoon and subsequent kneading for 180 seconds.

(3) Add another 30 g of DINP to the cup, knead at a rotation of 765 rpm and a revolution of 765 rpm for 60 seconds, followed by manual stirring with a stainless spoon and subsequent kneading for 180 seconds, thereby preparing a paste.

The paste prepared in the above manner is allowed to cool at 20° C. for 12 hours, and then viscosity is measured at 2 rpm and at 20 rpm by means of a BH-type viscometer.

It is preferred that the viscosity of the paste prepared in the manner as described above satisfies the formulae (n) to (p).

When the VIS2 is less than 400 Pa·s, there is a case that the anti-sagging property is not so different from that of conventional products. When the VIS20 is less than 80 Pa·s, it is difficult to impart high viscosity which is intended in the present invention. Also, when VIS2/VIS20 is less than 5.0, it is difficult to impart high thixotropy. Therefore, $VIS2 \geq 500$, $VIS20 \geq 90$, and $VIS2/VIS20 \geq 5.5$ are more preferred, and $VIS2 \geq 800$, $VIS20 \geq 130$, and $VIS2/VIS20 \geq 6$ are still more preferred.

Although a method for producing calcium carbonate before carrying out surface treatment for the surface-treated calcium carbonate according to the present invention is not particularly limited, such method is distinguished in dispersing method such as maturing concentration and maturing time, from the conventional method wherein maturation is conducted after terminating carbonation by adding a complex forming agent with calcium to milk of lime as described, for example, in Japanese Unexamined Patent Publication JP-A 10-72215. In fact, according to the above conventional method, dispersed microparticles are obtained by keeping the BET specific surface area after maturation as high as possible, however, in order to impart high viscosity and achieve reduction in weight which are objects of the present invention, a method capable of obtaining further dispersed microparticles is required.

Preferred conditions for preparing calcium carbonate used in the present invention are shown below:

Reaction Condition

[1] Concentration of milk of lime: 3.5 to 10.2% by weight

[2] Complex forming substance: 0.5 to 15% by weight

[3] Flow rate of carbon dioxide gas: 300 to 3000 L/hr.

[4] Gas concentration: 10 to 50%

Maturing Condition

[5] Concentration of calcium carbonate: 2.4 to 13.0% by weight

[6]. Maturing time: 24 to, 240 hours

Surface Treatment

[7] Amount of surface treating agent: 3.5 to 50% by weight

A preferred production method of calcium carbonate used in the present invention will be concretely explained below.

(Reaction Condition)

The concentration of the milk of lime in [1] is preferably in the range of 3.5 to 10.2% by weight. If the concentration of milk of lime is less than 3.5% by weight, not only the productivity is poor to increase the cost, but also it is difficult to expect improvement of dispersibility even when the concentration is made smaller. On the other hand, if the concentration of milk of lime is more than 10.2% by weight, aggregation of primary particles is likely to occur after reaction, leading to larger particle size than the average secondary particle size even after maturation, so that it is difficult to achieve a desired viscosity. Accordingly, the concentration is more preferably in the range of 5.0 to 9.0% by weight and still more preferably in the range of 6.0 to 8.0% by weight.

The adding amount of the complex forming substance in [2] is preferably in the range of 0.5 to 15% by weight. If the adding amount is less than 0.5% by weight, it is difficult to obtain microparticles which is an object of the present invention, whereas if the adding amount is more than 15% by weight, the primary particles become too fine so that the size of secondary particles after maturation may not satisfy the range of (f) which is a preferred dispersion state, with the result that it is difficult to impart a desired high viscosity. The timing of addition may be before or during carbonation, or may be both of before and during carbonation.

Examples of the complex forming substance include hydroxycarboxylic acids such as citric acid, oxalic acid and malic acid, and alkali metal salts, alkaline earth metal salts and ammonium salts thereof; polyhydroxycarboxylic acids such as gluconic acid and tartaric acid, and alkali metal salts, alkali earth metal salts and ammonium salts thereof; aminopolycarboxylic acids such as iminodiacetic acid, ethylenediaminetetraacetic acid and nitrilotriacetic acid, and alkali metal salts, alkali earth metal salts and ammonium salts thereof; polyacetic acids such as hexametaphosphoric acid and tripolyphosphoric acid, and alkali metal salts, alkaline earth metal salts and ammonium salts thereof; ketones such as acetylacetone, methyl acetoacetate and allyl acetoacetate; sulfuric acid and alkali metal salts, alkaline earth metal salts and ammonium salts thereof; and the like, and these substances may be used solely or in combination of two or more. Among these, hydroxycarboxylic acids, in particular, citric acid can be preferably used because they have a good binding property with calcium.

The flow rate of carbon dioxide gas in [3] is normally in the range of 300 to 3000 L/hr. per 1 kg of calcium hydroxide. If the flow rate is less than 300 L/hr., the size of primary particle after reaction is likely to become large, whereas if the flow rate is more than 3000 L/hr, the industrial cost increases, which is not desirable.

As for the gas concentration in [4], a range of 10 to 50% is preferred. If the gas concentration is less than 10%, the size of primary particle after reaction is likely to become large, whereas if it is more than 50%, the industrial cost increases, which is not desirable.

(Maturing Condition)

As for the concentration of calcium carbonate in [5], a range of 2.4 to 13.0% by weight is preferred. In the case where the concentration is less than 2.4% by weight, the industrial productivity is poor, whereas if the concentration is more than 13.0% by weight, it is difficult to stir the system uniformly when the dispersibility improves and the structural viscosity increases due to maturation, so that the average secondary particle size does not often satisfy the range in the formula (f). As a result of this, it is difficult to impart a desired high viscosity. Therefore, it is more preferably in the range of 4.0 to 11.0% by weight, and still more preferably in the range of 5.0 to 9.0% by weight.

As described above, since the maturing concentration can readily be considered as an important index for improving the dispersibility, it is more efficient to make the concentration lower within the preferred range, in particular, for fine particles.

As for the maturing time in [6], a time that allows proceeding of maturation to such a level that satisfies the formula (f) representing a preferable range as an index for dispersibility is preferred since imparting of high viscosity which is an object of the present invention can easily be achieved. In this manner, since the maturing time depends on the aforementioned production condition, the maturing time is not particularly limited, however, normally the range of 24 to 240 hours is preferred. If the maturing time is less than 24 hours, it is difficult to obtain desired dispersed particles, and if the maturing time is more than 240 hours, industrial cost increases. Therefore, the maturing time is more preferably in the range of 30 to 200 hours, and still more preferably in the range of 40 to 180 hours.

Production conditions other than those described above are as same as those of conventional manners. For example, the condition of the synthesis temperature is normally in the range of 5 to 30° C. and the condition of the maturing temperature is normally in the range of 30 to 70° C. Also the condition of stirring during maturation is sufficient if the stirring power capable of stirring the whole liquid system uniformly is achieved. However, conventional stirring capacity may unwillingly necessitate lower concentration of the system, which may cause a cost increase. Also in the point of improving not only productivity but also dispersibility, it is preferred that the stirring power is higher than that of the conventional manner. As a stirring mechanism, a paddle, a turbine, a propeller, a high-speed propeller and the like are generally used.

(Surface Treatment)

As for the amount of surface treating agent in [7], since it varies depending on the specific surface area of the base of calcium carbonate, it is not particularly limited as far as it falls within the range of "As" in the formula (b), and is normally in the range of 3.5 to 50% by weight. If the surface treating amount is less than 3.5% by weight, there is a case that the surface of the calcium carbonate comprising fine and highly-dispersible particles of the present invention cannot be covered sufficiently. As a result of this, secondary aggregates are formed between untreated surfaces during drying and powderization, so that it is difficult to exert the effect of the surface-treated calcium carbonate. On the other hand, if it is more than 50% by weight, the surface treating agent separates into a resin component or a plasticized component due to an excess of the surface treating agent, to cause the bleeding phenomenon and the surface roughing phenomenon. Accordingly, it is more preferably in the range of 5 to 40% by weight, and still more preferably in the range of 7 to 35% by weight. The manner of surface treatment is not particularly limited, and either of a wet-system or a dry-system is employed.

As the organic surface treating agent used in the present invention, saturated fatty acids represented by caprylic acid, lauric acid, myristic acid, palmitic acid, stearic acid and araginic acid, unsaturated fatty acids represented by oleic acid, elaidic acid, linoleic acid and ricinolic acid; alicyclic carboxylic acids represented by naphthenic acid, resin acids represented by abietic acid, pimaric acid, parastphosphoric acid and neoabietic acid, and modified rosins represented by dismutation rosins, hydrogenated rosins, dimeric rosins and trimeric rosins thereof; sulfonic acids represented by alkylbenzenesulfonic acid, as well as alkali metal salts, alkaline earth metal salts, ammonium salts and amine salts thereof, as well as anionic, cationic, nonionic surfactants as exemplified below can be used solely or in combination of two or more. Among these, alkali metals of fatty acids and alkali metals of resin acids are preferred to use from the viewpoint of reactivity with calcium carbonate.

Examples of the anionic surfactant include alkylether sulfuric acids exemplified by polyoxyethylene alkylether sulfuric acids and the like; alkylether phosphoric acids exemplified by polyoxyethylene alkylether phosphoric acids and the like; alkylarylether sulfuric acids exemplified by polyoxyethylene alkylphenylether sulfuric acids and the like; alkylarylether phosphoric acids exemplified by polyoxyethylene alkylphenylether phosphoric acids and the like; alkyl sulfuric acid esters exemplified by polyoxyalkyl sulfuric acid esters and the like; alkyl phosphoric acid esters exemplified by polyoxyalkyl phosphoric acid esters and the like; alkylaryl sulfuric acid esters exemplified by polyoxyalkylphenyl sulfuric acid esters and the like; alkylaryl phosphoric acid esters exemplified by polyoxyalkylphenyl phosphoric acid esters and the like; alkylamide sulfuric acid esters exemplified sulfuric acid esters of fatty acid alkyrolamide; alkylsulfonic acids exemplified by polyoxyethylene alkylsulfonic acids and the like; alkylbenzene sulfonic acids; alkylnaphthalene sulfonic acids; sulfosuccinic acids; sulfosuccinic acid esters exemplified by dialkylsulfosuccinic acid esters; α-olefin sulfonic acids, N-acyl sulfonic acids and/or alkali metal salts, alkaline earth metal salts, amine salts and ammonium salts thereof, and the like; anionic polymer dispersing agent exemplified by copolymers composed of α,β unsaturated monocarboxylic acids, α,β unsaturated dicarboxylic acids, metacyrlic acid alkyl esters, (metha) acrylic ethers having an alkoxy group, (metha)acrylates having a cyclohexyl group, α,β monoethylenic unsaturated hydroxyesters, polyalkyleneglycol mono(metha)acrylates, vineylesters, vinyl aromatic series, unsaturated nitriles, unsaturated dicarboxylic acid esters, vinyl ethers, conjugated dienes, chain olefins, cyclic olefins, monomers containing a sulfo group, and partly or fully neutralized salts with alkali metals, alkaline earth metals and ammonium, and the like.

Examples of the cationic surfactant include aliphatic amine salts such as stearylamine acetate, stearylamine hydrochloride; aliphatic quaternary ammonium salts such as lauryltrimethylammonium chloride, stearylmethylammonium chloride and the like; aromatic quaternary ammonium salts such as alkylbenzyldimethyl ammonium chloride; heterocyclic quaternary ammonium compounds and the like; cationic polymer dispersing agents having a polar group such as an amino group (primary amine group), an imino group (secondary amine group), a tertiary amine group, a quaternary ammonium group, a hydrazine group and the like, copolymers of monomers, which can copolymerize with monomers having such a polar group, for example, α,β unsaturated monocarboxylic acids, α,β unsaturated dicarboxylic acids, methacrylic acid alkyl esters, (metha)acrylic ethers having an alkoxy group, (metha)acrylate having a cyclohexyl group, α,β monoethylenic unsaturated hydroxyesters, vinylesters, vinyl aromatic series, unsaturated nitrites, unsaturated dicarboxylic acid esters, vinyl ethers, conjugated diens, chain olefins, cyclic olefins, copolymers with monomers such as sulfo-group containing monomers, and partly or fully neutralized salts thereof with alkali metals, alkaline earth metals, ammonium and the like.

Examples of the nonionic surfactant include polyoxyethylene and derivatives thereof, betaines exemplified by carboxybetaine, sulfobetaine and the like, aminocarboxylic acids and imidazoline derivatives.

After carrying out the surface treatment, it is preferred to filter and wash out various ions such as alkali metal ions contained in the slurry with water so as to satisfy the formula (1) as described above. Although the conductivity of the filtrate is not particularly limited, it is normally not more than 10 mS/cm, more preferably not more than 1 mS/cm, and still more preferably not more than 300 μS/cm.

The washing method is not particularly limited, and water washing and concentration may be carried out by using a thickner, an oliver, a rotary filter, an automatic pressure filter (Larox Corp.) and the like.

As described above, the surface-treated calcium carbonate according to the present invention is particularly preferred for use in resins, and is blended in, for example, resins for molding, resins for paint, resins for ink, resins for sealant, resins for adhesive and the like, to provide resin compositions having excellent characteristics and physical properties.

The resins for molding are not particularly limited, and examples of which include thermoplastic resins represented by ABS resins, fluorine resins, polyethylene terephthalate, polycarbonate, polyolefin resins such as polyethylene, polypropylene, ethylene-propylene copolymers, copolymers of ethylene or propylene with other monomers, polystyrene resins, acrylic resins, methacrylic resins, vinyl chloride resins, vinylidene chloride resins, polyamide resins, polyether resins, vinyl acetate resins, polyvinylalcohol resins; and thermosetting resins represented by phenol resins, urea resins, melamine resins, epoxy resins, polyurethane resins, polyimide resins and the like. These resins may be used solely or in combination of two or more.

The blending ratio of the surface-treated calcium carbonate according to the present invention with these resins is not particularly limited, and can be appropriately determined in accordance with the desired physical properties. However, normally a preferred blending ratio is 1 to 100 parts by weight of the surface-treated calcium carbonate, relative to 100 parts by weight of resin. It goes without saying that various kinds of additives may be added as necessary.

The resins for paints are not particularly limited and examples of which include solvent-type resins for paint represented by alkyd resins, acrylic resins, vinyl acetate resins, urethane resins, silicone resins, fluororesins, styrene resins, melamine resins, epoxy resins and the like; for aqueous paints, general emulsion resins for paint represented by alkyd resins, acrylic resins, latex resins, vinyl acetate resins, urethane resins, silicone resins, fluororesins, styrene resins, melamine resins, epoxy resins and the like; general water-soluble resins for paint represented by alkyd resins, amine resins, styrene-allyl alcohol resins, amino alkyd resins, polybutadiene resins and the like; dispersion resins for paint wherein emulsion resins and water-soluble resins are blended; dispersion resins using bridged water-soluble resins as an emulsifying agent; and acrylhydrosols and the like. These resins may be used solely or in combination of two or more.

The blending ratio of the surface-treated calcium carbonate according to the present invention with respect to these resins is not particularly limited, and can be appropriately determined in accordance with the desired physical properties. However, normally a preferred blending ratio is 1 to 100 parts by weight of the surface-treated calcium carbonate, relative to 100 parts by weight of resin. It goes without saying that various kinds of additives such as plasticizers and dispersing agents may be added as necessary.

The resins for plastisols are not particularly limited and examples of which include polyvinyl-chloridesols, acrylhydrosols, water-soluble acrylsols, urethansols and the like. These resins may be used solely or in combination of two or more.

The blending ratio of the surface-treated calcium carbonate according to the present invention with respect to these resins is not particularly limited, and can be appropriately determined in accordance with the desired physical properties. However, normally a preferred blending ratio is 1 to 100 parts by weight of the surface-treated calcium carbonate, relative to 100 parts by weight of resin. It goes without saying that various kinds of additives such as stabilizing agents may be added as necessary.

The resins for inks are not particularly limited and examples of which include rosin modified phenol resin, urea resins, melamine resins, ketone resins, polyvinyl chloride resins, polyvinyl chloride-vinyl acetate copolymers, butyral resins, styrene-maleic acid resins, chlorinated polypropylenes, acrylic resins, cumarone-indene resins, petroleum resins, polyester resins, alkyd resins, polyamide resins, epoxy resins, polyurethane resins, nitro cellulose, ethyl cellulose, ethylhydroxy cellulose, cyclized rubbers, chlorinated rubbers and the like. These resins may be used solely or in combination of two or more.

The blending ratio of the surface-treated calcium carbonate according to the present invention with respect to these resins is not particularly limited, and can be appropriately determined in accordance with the desired physical property. However, normally a preferred blending ratio is 1 to 100 parts by weight of the surface-treated calcium carbonate, relative to 100 parts by weight of resin. It goes without saying that various kinds of additives such as stabilizing agents and dryers may be added as necessary.

The resins for sealants are not particularly limited, and examples of which include polyurethane resins, polysulfide resins, silicone resins, modified silicone resins, polyisobutylene resins, epoxy resins, polyester resins and the like. These resins may be used solely or in combination of two or more.

The blending ratio of the surface-treated calcium carbonate according to the present invention with these resins is not particularly limited, and can be appropriately determined in accordance with the desired physical property. However, normally a preferred blending ratio is 1 to 100 parts by weight of the surface-treated calcium carbonate, relative to 100 parts by weight of resin. It goes without saying that various kinds of additives such as coloring agents and stabilizing agents may be added as necessary.

The resins for adhesives are not particularly limited, and examples of which include urea resins, phenol resins, epoxy resins, silicone resins, acrylic resins, polyurethane resins, polyester resins and the like. These resins may be used solely or in combination of two or more.

The blending ratio of the surface-treated calcium carbonate according to the present invention with these resins is not particularly limited, and can be appropriately determined in accordance with the desired physical property. However, normally a preferred blending ratio is 1 to 100 parts by weight of the surface-treated calcium carbonate, relative to 100 parts by weight of resin. It goes without saying that various kinds of additives such as stabilizing agents and plasticizers may be added as necessary.

For adjusting the viscosity and other physical properties, the resin composition of the present invention may be added with, besides the surface-treated calcium carbonate according to the present invention, fillers such as colloidal calcium carbonate, ground calcium carbonate, colloidal silica, talc, kaolin, zeolite, resin balloon and glass balloon; plasticizers such as dioctyl phthalate and dibutyl phthalate; solvents exemplified by petroleum solvents such as toluene and xylene, ketones such as acetone and methylethylketone, and ether esters such as cellosolve acetate and the like; or various other additives and coloring agents such as silicone oil, fatty acid ester modified silicone oil and the like may be added solely or in combination of two or more, as necessary.

The resin composition according to the present invention has excellent viscosity/thixotropy and anti-slipping property, as well as joint conformability when the resin composition is curable-resins composition represented by for example, sealants and additives. Further, when the resin composition is a resin composition for paint or ink, for example, it has an excellent anti-sagging property, excellent luster, high transparency and high coating strength. Furthermore, when the resin composition is a molding resin composition, deterioration in strength of the weld line surface is prevented, and excellent strength is realized.

In the following, the present invention will be explained more specifically by way of examples and comparative examples, however, it is to be noted that the present invention is in no way limited to these examples without departing from the scope of the present invention.

In the following description, "%" means "% by weight" and "part(s)" means "part(s) by weight", unless otherwise specified.

EXAMPLE 1

To milk of lime having a concentration of 8% at a temperature of 10° C., citric acid as a complex forming substance was added so that the concentration thereof was 1.7% of calcium hydroxide, and to the resultant slurry, 20% $CO_2$ gas was introduced at a rate of 1700 L/hr. per 1 kg of calcium hydroxide, to prepare calcium carbonate slurry. Next, the calcium carbonate slurry was adjusted to have a concentration of 10%, and stirred at a temperature in the range of 45 to 50° C. for 50 hours to conduct maturation. Average particle size (Dx) after maturation was 0.20 μm. To this calcium carbonate slurry, 10% sodium stearate dissolved in hot water was added in an amount of 15% with respect to a solid content of the calcium carbonate, and the surface treating agent was allowed to sufficiently adsorb to the surface of the calcium carbonate by stirring, followed by dehydrating, drying and powderization to synthesize a surface-treated calcium carbonate that has been treated with an organic surface treating agent having a BET specific surface area (SW) of 48 $m^2$/g. The reduced heat amount (Tg) at 200° C. to 500° C. of the surface-treated calcium carbonate was 118 mg/g. The average pore diameter (Dxp) was 0.016 μm, and the average pore diameter amount (Dyp/Dxp) was 79. Physical properties of the surface-treated calcium carbonate thus obtained are shown in Table 1.

EXAMPLE 2

A calcium carbonate surface-treated with an organic surface treating agent was synthesized in the same method as in Example 1, except that the calcium carbonate slurry concentration was changed to 7%. Physical properties of the obtained surface-treated calcium carbonate are shown in Table 1.

EXAMPLE 3

A calcium carbonate surface-treated with an organic surface treating agent was synthesized in the same method as in Example 2, except that the maturing time was changed to 120 hours. Physical properties of the obtained surface-treated calcium carbonate are shown in Table 1.

EXAMPLE 4

A calcium carbonate surface-treated with an organic surface treating agent was synthesized in the same method as in Example 1, except that after surface treatment, the cake of calcium carbonate was washed with water and dehydrated by the use of a line of automatic pressure: filters (manufactured by Larox Corp.) so that the conductivity of the filtrate arrived at 300 μS/cm. Physical properties of the obtained surface-treated calcium carbonate are shown in Table 1.

EXAMPLE 5

A calcium carbonate surface-treated with an organic surface treating agent was synthesized in the same method as in Example 1, except that the surface-treated amount was changed to 25%. Physical properties of the obtained surface-treated calcium carbonate are shown in Table 1.

EXAMPLE 6

To milk of lime having a concentration of 5% at a temperature of 10° C., citric acid as a complex forming substance was added so that the concentration thereof was 10% of calcium hydroxide, and to the resultant slurry, 20% $CO_2$ gas was introduced at a rate of 1700 L/hr. per 1 kg of calcium hydroxide, to prepare calcium carbonate slurry. Next, the calcium carbonate slurry was adjusted to have a concentration of 3%, and stirred at a temperature in the range of 45 to 50° C. for 150 hours to conduct maturation. Average particle size (Dx) after maturation was 0.38 µm. To this calcium carbonate slurry, 10% sodium stearate dissolved in hot water was added in an amount of 35% with respect to a solid content of the calcium carbonate, and the surface treating agent was allowed to sufficiently adsorb to the surface of the calcium carbonate by stirring, followed by dehydrating, drying and powderization to synthesize a surface-treated calcium carbonate that has been treated with an organic surface treating agent having a BET specific surface area (SW) of 125 m$^2$/g. The reduced heat amount (Tg) at 200° C. to 500° C. of the surface-treated calcium carbonate was 296 mg/g. The average pore diameter (Dxp) was 0.005 µm, and the average pore diameter amount (Dyp/Dxp) was 148. Physical properties of the surface-treated calcium carbonate thus obtained are shown in Table 1.

EXAMPLE 7

A calcium carbonate surface-treated with an organic surface treating agent was synthesized in the same method as in Example 1, except that trisodium citrate as a complex forming substance was used so that the concentration thereof was 3% of calcium hydroxide. Physical properties of the obtained surface-treated calcium carbonate are shown in Table 1.

EXAMPLE 8

A calcium carbonate surface-treated with an organic surface treating agent was synthesized in the same method as in Example 1, except that the organic surface treating agent changed to lauric acid. Physical properties of the obtained surface-treated calcium carbonate are shown in Table 1.

EXAMPLE 9

A calcium carbonate surface-treated with an organic surface treating agent was synthesized in the same method as in Example 1, except that the organic surface treating-agent was changed to sodium laurate. Physical properties of the obtained surface-treated calcium carbonate are shown in Table 2.

EXAMPLE 10

A calcium carbonate surface-treated with an organic surface treating agent was synthesized in the same method as in Example 1, except that the organic surface treating agent was changed to sodium palmitate. Physical properties of the obtained surface-treated calcium carbonate are shown in Table 2.

EXAMPLE 11

A calcium carbonate surface-treated with an organic surface treating agent was synthesized in the same method as in Example 1, except that the organic surface treating agent was changed to sodium stearate: potassium resinate=3:2. Physical properties of the obtained surface-treated calcium carbonate are shown in Table 2.

EXAMPLE 12

A calcium carbonate surface-treated with an organic surface treating agent was synthesized in the same method as in Example 1, except that the organic surface treating agent was changed to potassium resinate. Physical properties of the obtained surface-treated calcium carbonate are shown in Table 2.

EXAMPLE 13

A calcium carbonate surface-treated with an organic surface treating agent was synthesized in the same method as in Example 1, except that the organic surface treating agent was changed to sodium stearate: alkyl benzene sodium sulfonate=3:1. Physical properties of the obtained surface-treated calcium carbonate are shown in Table 2.

COMPARATIVE EXAMPLE 1

A calcium carbonate surface-treated with an organic surface treating agent was synthesized in the same method as in Example 1, except that the adding amount of the organic surface treating agent was changed to 5%. Physical properties of the obtained surface-treated calcium carbonate are shown in Table 2.

COMPARATIVE EXAMPLE 2

To milk of lime having a concentration of 4% at a temperature of 10° C., citric acid as a complex forming substance was added so that the concentration thereof was 18% of calcium hydroxide, and to the resultant slurry, 20% $CO_2$ gas was introduced at a rate of 1700 L/hr. per 1 kg of calcium hydroxide, to prepare calcium carbonate slurry. Next, the calcium carbonate slurry was adjusted to have a concentration of 2%, and stirred at a temperature in the range of 45 to 50° C. for 200 hours to conduct maturation. Average particle size (Dx) after maturation was 2.3 µm. To this calcium carbonate slurry, 10% sodium stearate dissolved in hot water was added in an amount of 45% with respect to a solid content of the calcium carbonate, and the surface treating agent was allowed to sufficiently adsorb to the surface of the calcium carbonate by stirring followed by dehydrating, drying and powderization to synthesize a surface-treated calcium carbonate that has been treated with an organic surface treating agent having a BET specific surface area (SW) of 175 m$^2$/g. The reduced heat amount (Tg) at 200° C. to 500° C. of the surface-treated calcium carbonate was 402 mg/g. The average pore diameter (Dxp) was 0.003 µm, and the average pore diameter amount (Dyp/Dxp) was 47. Physical properties of the surface-treated calcium carbonate thus obtained are shown in Table 2.

COMPARATIVE EXAMPLE 3

As is described in Example 1 of Japanese Unexamined Patent Publication JP-A 10-72215, to milk of lime having a concentration of 11.8% at a temperature of 10° C., trisodium citrate as a complex forming substance was added so that the concentration thereof was 3% of calcium hydroxide, and to the resultant slurry, 20% $CO_2$ gas was introduced at a rate of 1700 L/hr. per 1 kg of calcium hydroxide, to prepare calcium carbonate slurry having a concentration of 14.9%. Next, the calcium carbonate slurry was, without adjusting the concentration of 14.9% leaving as it was, stirred at a temperature in the range of 45 to 50° C. for 50 hours to conduct maturation. Average particle size (Dx) after maturation was 0.50 µm. To this calcium carbonate slurry, 10% sodium stearate dissolved in hot water was added in an amount of 15% with respect to a solid content of the calcium carbonate, and the surface treating agent was allowed to sufficiently adsorb to the surface of the calcium carbonate by stirring, followed by dehydrating, drying and powderization to synthesize a surface-treated calcium carbonate that has been treated with an organic surface treating agent having a BET specific surface area (SW) of 42 m$^2$/g. The reduced heat rate (Tg) at 200° C. to 500° C. of the surface-treated calcium carbonate was 101 mg/g. The average pore diameter (Dxp) was 0.018 μm, and the average pore diameter amount (Dyp/Dxp) was 27. Physical properties of the surface-treated calcium carbonate thus obtained are shown in Table 2.

COMPARATIVE EXAMPLE 4

To milk of lime having a concentration of 11.8% at a temperature of 10° C., citric acid as a complex forming substance was added so that the concentration thereof was 0.2% of calcium hydroxide, and to the resultant slurry, 20% $CO_2$ gas was introduced at a rate of 1700 L/hr. per 1 kg of calcium hydroxide, to prepare calcium carbonate slurry having a concentration of 14.9%. Next, the calcium carbonate slurry was, without adjusting the concentration of 14.9% leaving as it was, stirred at a temperature in the range of 45 to 50° C. for 50 hours to conduct maturation. Average particle size (Dx) after maturation was 0.49 μm. To this calcium carbonate slurry, 10% sodium stearate dissolved in hot water was added in an amount of 5% with respect to a solid content of the calcium carbonate, and the surface treating agent was allowed to sufficiently adsorb to the surface of the calcium carbonate by stirring, followed by dehydrating, drying and powderization to synthesize a surface-treated calcium carbonate that has been treated with an organic surface treating agent having a BET specific surface area (SW) of 17 m$^2$/g. The reduced heat amount (Tg) at 200° C. to 500° C. of the surface-treated calcium carbonate was 42 mg/g. The average pore diameter (Dxp) was 0.042 μm, and the average pore diameter amount (Dyp/Dxp) was 38. Physical properties of the surface-treated calcium carbonate thus obtained are shown in Table 2.

COMPARATIVE EXAMPLE 5

A calcium carbonate surface-treated with an organic surface treating agent was synthesized in the same method as in Comparative Example 3, except that the organic surface treating agent was changed to potassium resinate. Physical properties of the obtained surface-treated calcium carbonate are shown in Table 2.

TABLE 1

|  | Example 1 | Example 2 | Example 3 | Example 4 | Example 5 | Example 6 | Example 7 | Example 8 |
|---|---|---|---|---|---|---|---|---|
| (a)Sw (m$^2$/g) | 48 | 51 | 53 | 48 | 43 | 125 | 44 | 49 |
| (b)As (mg/m$^2$) | 2.5 | 2.4 | 2.4 | 2.4 | 5.0 | 2.4 | 2.8 | 2.3 |
| (c)Dxp (μm) | 0.016 | 0.016 | 0.015 | 0.015 | 0.012 | 0.005 | 0.016 | 0.016 |
| (d)Dyp/Dxp | 79 | 86 | 99 | 91 | 53 | 148 | 71 | 80 |
| (e)Dxs (μm) | 0.25 | 0.15 | 0.11 | 0.23 | 0.53 | 0.83 | 0.87 | 0.25 |
| (f)Dys (%) | 12 | 5 | 0 | 9 | 24 | 23 | 28 | 9 |
| (k)Sw · Dxp | 0.77 | 0.82 | 0.80 | 0.72 | 0.52 | 0.63 | 0.70 | 0.78 |
| (l)Is (μmol/m$^2$) | 1.68 | 1.61 | 1.60 | 0.36 | 4.21 | 1.61 | 3.39 | 2.57 |
| (m)Dx (μm) | 0.20 | 0.11 | 0.08 | 0.23 | 0.23 | 0.38 | 0.42 | 0.20 |
| (n)VIS 2 (Pa · s) | 1150 | 1350 | 1480 | 970 | 1430 | 1620 | 555 | 1200 |
| (o)VIS 20 (Pa · s) | 170 | 195 | 210 | 155 | 295 | 245 | 115 | 175 |
| (p)VIS2/VIS20 | 6.8 | 6.9 | 7.0 | 6.3 | 4.8 | 6.6 | 4.8 | 6.9 |
| ① Milk of lime conc. (%) | 8.0 | 8.0 | 8.0 | 8.0 | 8.0 | 5.0 | 8.0 | 8.0 |
| ② Complex forming substance conc. (%) | 1.7 | 1.7 | 1.7 | 1.7 | 1.7 | 10 | 3.0 | 1.7 |
| Complex forming substance | citric acid | citric acid | citric acid | citric acid | citric acid | citric acid | trisodium citrate | citric acid |
| ③ Carbon dioxide amount (L/hr) | 1700 | 1700 | 1700 | 1700 | 1700 | 1700 | 1700 | 1700 |
| ④ Gas conc. (%) | 20 | 20 | 20 | 20 | 20 | 20 | 20 | 20 |
| ⑤ Calcium carbonate conc. (%) | 10 | 7.0 | 7.0 | 10 | 10 | 3.0 | 10 | 10 |
| ⑥ Maturing time (hr) | 50 | 50 | 120 | 50 | 50 | 150 | 50 | 50 |
| ⑦ Surface-treated amount (%) | 15 | 15 | 15 | 15 | 25 | 35 | 15 | 15 |
| Surface treating agent | sodium stearate | sodium stearate | sodium stearate | sodium stearate | sodium stearate | sodium stearate | sodium stearate | lauric acid |
| Conductivity of filtrate (μS/cm) | 2000 | 2000 | 2000 | 300 | 3600 | 2200 | 1900 | 200 |

TABLE 2

|  | Example 9 | Example 10 | Example 11 | Example 12 | Example 13 | Comp. Ex. 1 | Comp. Ex. 2 | Comp. Ex. 3 | Comp. Ex. 4 | Comp. Ex. 5 |
|---|---|---|---|---|---|---|---|---|---|---|
| (a)Sw (m$^2$/g) | 50 | 47 | 47 | 47 | 46 | 51 | 175 | 42 | 17 | 44 |
| (b)As (mg/m$^2$) | 2.5 | 2.5 | 2.4 | 2.3 | 2.3 | 0.8 | 2.3 | 2.4 | 2.5 | 3.0 |
| (c)Dxp (μm) | 0.016 | 0.016 | 0.016 | 0.016 | 0.016 | 0.031 | 0.003 | 0.018 | 0.042 | 0.018 |
| (d)Dyp/Dxp | 110 | 80 | 77 | 69 | 75 | 27 | 47 | 27 | 38 | 26 |
| (e)Dxs (μm) | 0.25 | 0.31 | 0.29 | 0.36 | 0.30 | 0.76 | 8.6 | 1.3 | 0.56 | 1.7 |
| (f)Dys (%) | 7 | 13 | 15 | 18 | 18 | 35 | 68 | 44 | 22 | 58 |
| (k)Sw · Dxp | 0.80 | 0.75 | 0.75 | 0.75 | 0.74 | 1.58 | 0.53 | 0.76 | 0.71 | 0.79 |
| (l)Is (μmol/m$^2$) | 2.57 | 1.97 | 2.09 | 1.94 | 1.85 | 0.61 | 1.64 | 2.84 | 2.45 | 2.80 |
| (m)Dx (μm) | 0.20 | 0.20 | 0.20 | 0.20 | 0.20 | 0.58 | 2.3 | 0.50 | 0.49 | 0.50 |
| (n)VIS 2 (Pa · s) | 1250 | 985 | 985 | 890 | 975 | 390 | 95 | 325 | 245 | 275 |
| (o)VIS 20 (Pa · s) | 175 | 155 | 155 | 150 | 155 | 75 | 15 | 80 | 70 | 70 |
| (p)VIS2/VIS20 | 7.1 | 6.4 | 6.4 | 5.9 | 6.3 | 5.2 | 6.3 | 4.1 | 3.5 | 3.9 |

TABLE 2-continued

|  | Example 9 | Example 10 | Example 11 | Example 12 | Example 13 | Comp. Ex. 1 | Comp. Ex. 2 | Comp. Ex. 3 | Comp. Ex. 4 | Comp. Ex. 5 |
|---|---|---|---|---|---|---|---|---|---|---|
| ① Milk of lime conc. (%) | 8.0 | 8.0 | 8.0 | 8.0 | 8.0 | 8.0 | 4.0 | 11.8 | 11.8 | 11.8 |
| ② Complex forming substance conc. (%) | 1.7 | 1.7 | 1.7 | 1.7 | 1.7 | 1.7 | 18 | 3.0 | 0.2 | 3.0 |
| Complex forming substance | citric acid | citric acid | citric acid | citric acid | citric acid | citric acid | citric acid | trisodium citrate | citric acid | trisodium citrate |
| ③ Carbon dioxide amount (L/hr) | 1700 | 1700 | 1700 | 1700 | 1700 | 1700 | 1700 | 1700 | 1700 | 1700 |
| ④ Gas conc. (%) | 20 | 20 | 20 | 20 | 20 | 20 | 20 | 20 | 20 | 20 |
| ⑤ Calcium carbonate conc. (%) | 10 | 10 | 10 | 10 | 10 | 10 | 2.0 | 14.9 | 14.9 | 14.9 |
| ⑥ Maturing time (hr) | 50 | 50 | 50 | 50 | 50 | 50 | 200 | 50 | 50 | 50 |
| ⑦ Surface-treated amount (%) | 15 | 15 | 15 | 15 | 15 | 5 | 45 | 15 | 5 | 13 |
| Surface treating agent | sodium laurate | sodium palmitate | sodium stearate: potassium resinate = 3:2 | potassium resinate | sodium stearate: DBS-Na = 3:1 | sodium stearate | sodium stearate | sodium stearate | sodium stearate | pottassium stearate |
| Conductivity of filtrate (μS/cm) | 800 | 2000 | 2200 | 2200 | 2200 | 800 | 3800 | 2000 | 1400 | 2100 |

EXAMPLES 14 TO 20, COMPARATIVE EXAMPLES 6 TO 9

Using the surface-treated calcium carbonates synthesized by the above-mentioned Examples 1 to 7 and Comparative Examples 1 to 4, molding resin compositions were prepared according to the following composition. The evaluation results of the obtained molding resin compositions are shown In Table 3.

(Composition)

| Surface-treated calcium carbonate | 15 parts |
|---|---|
| Polypropylene resin | 85 parts |

After the above-mentioned two kinds were dry-blended by a Henshel mixer (manufactured by Kawata) and pelletized by an extruder (NEXT T-60 manufactured by Kobe Steel, Ltd.), dumbbells were prepared by an injection molding machine and tested for tensile strength, bend strength and impact strength. With respect to the dumbbells for testing of strength at a weldline portion, the compositions were poured in from two gates to form a weldline in the middle of the dumbbells. The other dumbbells were made by pouring-in from one gate. Using the obtained dumbbells, various characteristics were measured and evaluated by the following methods.

(Tensile Strength, Bend Strength, Impact Strength)

Tensile strength was measured by a tensile strength test method of plastics according to JIS K7113, bend strength was measured by a bend strength test method of rigid plastics according to JIS K7203 and impact strength was measured by Charpy impact test method of rigid plastics according to JIS K7111.

(Scratch Test)

Plastic sheets having a size of 30 mm×80 mm×1 mm (thickness) were prepared and tested for scratch using a scratch tester (manufactured by Toyo Seiki Seisakusho) and evaluated by the following criteria.

⊚: Extremely good (No scratches are observed.)
○: Good (Scratches are hardly observed.)
Δ: Ordinary (Scratches are somewhat observed.)
X: Bad (Scratches are considerably observed.)

TABLE 3

|  | Surface-treated calcium carbonate | Tensile strength at an ordinary portion (N/mm²) | Tensile strength at a weldline portion (N/mm²) | Bend strength at an ordinary portion (N/mm²) | Bend strength at a weldline portion (N/mm²) | Impact strength (N · cm/cm²) | Scratch test |
|---|---|---|---|---|---|---|---|
| Example 14 | Example 1 | 34 | 32 | 47 | 36 | 43 | ○ |
| Example 15 | Example 2 | 36 | 33 | 49 | 37 | 45 | ⊚ |
| Example 16 | Example 3 | 37 | 33 | 50 | 38 | 45 | ⊚ |
| Example 17 | Example 4 | 34 | 32 | 46 | 35 | 43 | ○ |
| Example 18 | Example 5 | 29 | 30 | 44 | 32 | 36 | Δ~○ |
| Example 19 | Example 6 | 41 | 35 | 54 | 41 | 49 | ○ |
| Example 20 | Example 7 | 30 | 29 | 42 | 33 | 38 | ○ |
| Comp. Ex. 6 | Comp. Ex. 1 | 19 | 17 | 34 | 24 | 27 | X |

TABLE 3-continued

|  | Surface-treated calcium carbonate | Tensile strength at an ordinary portion (N/mm$^2$) | Tensile strength at a weldline portion (N/mm$^2$) | Bend strength at an ordinary portion (N/mm$^2$) | Bend strength at a weldline portion (N/mm$^2$) | Impact strength (N · cm/cm$^2$) | Scratch test |
|---|---|---|---|---|---|---|---|
| Comp. Ex. 7 | Comp. Ex. 2 | 13 | 11 | 22 | 15 | 19 | X |
| Comp. Ex. 8 | Comp. Ex. 3 | 16 | 15 | 29 | 21 | 25 | X |
| Comp. Ex. 9 | Comp. Ex. 4 | 21 | 19 | 24 | 19 | 23 | X |

As is apparent from the results of Table 3, molding resin compositions blended with the surface-treated calcium carbonates of the present invention are not only excellent in tensile strength, bend strength and impact strength, but excellent in prevention of strength lowering at a weldline portion, from which it is understood that the molding resin compositions are also excellent in adhesion to an object to be adhered. Moreover, the adding amount of the calcium carbonate was reduced by approximately 5% as compared with the conventional one and thus it was confirmed that the surface-treated calcium carbonate of the present invention was also effective in weight reduction.

EXAMPLES 21 TO 27, COMPARATIVE EXAMPLES 10 TO 13

Using the surface-treated calcium carbonates synthesized by the above-mentioned Examples 1 to 7 and Comparative Examples 1 to 4, paint resin compositions were prepared according to the following compositions.

(Composition)

| | |
|---|---|
| Surface-treated calcium carbonate | 50 parts |
| Heavy calcium carbonate (Super SSS manufactured by Maruo Calcium Co., Ltd.) | 41 parts |
| Alkid resin (Beccozol P-470-70 manufactured by Dainippon Ink & Chemicals, Inc.) | 250 parts |
| Titanium dioxide (TIPAQUE R-820 manufactured by Ishihara Sangyo Kaisha, Ltd.) | 120 parts |
| Mineral spirit | 70 parts |
| Dryer | 14 parts |
| Anti-skinning agent | 1.5 parts |
| Glass beads | 350 parts |

The above-mentioned compositions were dispersed by the use of SG mill up to 20 μm or less by a grindometer and glass beads were removed to thereby prepare paint resin compositions.

The obtained paint resin compositions were tested for various characteristics were measured and evaluated by the following methods.

(Gloss, Gloss after Water-Resistance Test, Gloss Retention)

Each of the paint resin compositions was applied to one side of a glass plate by the use of an applicator of 100 microns and dried at ordinary room temperature for 24 hours and tested for 60° gloss by the use of Murakami gloss meter. Then, the glass plate was dipped in water for 3 days and gloss retention was measured.

(Sagging Property)

Each of the paint resin compositions was diluted with mineral spirit up to a KU value of 78 and applied to a black measuring paper by the use of an applicator of 250, 200, 150 and 100 microns. Immediately after application, the paper was stood with the coated surface to be perpendicular and left to stand at ordinary room temperature for 24 hours. The conditions of sagging of the coated film were evaluated by the following criteria.

◯: Good (No sagging was observed.)

Δ: Ordinary (Sagging was somewhat observed.)

X: Bad (Sagging was observed.)

(Scratch Test of the Coating Film)

Each of the paint resin compositions was applied to one side of a glass plate by the use of an applicator of 1000 microns and dried at normal room temperature for one week and tested for scratch using a scratch tester (manufactured by Toyo Seiki Seisakusho). The results were evaluated by the following criteria.

⊙: Extremely good (No scratches are observed.)

◯: Good (Scratches are hardly observed.)

Δ: Ordinary (Scratches are somewhat observed.)

X: Bad (Scratches are considerably observed.)

TABLE 4

| | Surface-treated calcium carbonate | 60° initial gloss | 60° gloss after water resistance test | Gloss retention % | Sagging | | | | Scratch test of coating film |
|---|---|---|---|---|---|---|---|---|---|
| | | | | | 250 μm | 200 μm | 150 μm | 100 μm | |
| Example 21 | Example 1 | 90.5 | 87.0 | 96 | Δ | ◯ | ◯ | ◯ | ◯ |
| Example 22 | Example 2 | 92.5 | 89.0 | 96 | Δ | ◯ | ◯ | ◯ | ◯ |
| Example 23 | Example 3 | 93.0 | 90.0 | 97 | ◯ | ◯ | ◯ | ◯ | ⊙ |
| Example 24 | Example 4 | 90.0 | 87.0 | 95 | Δ | ◯ | ◯ | ◯ | ◯ |
| Example 25 | Example 5 | 87.5 | 85.5 | 98 | ◯ | ◯ | ◯ | ◯ | ◯ |
| Example 26 | Example 6 | 93.5 | 85.5 | 91 | ◯ | ◯ | ◯ | ◯ | ⊙ |
| Example 27 | Example 7 | 88.5 | 84.5 | 95 | Δ | Δ | ◯ | ◯ | ◯ |
| Comp. Ex. 10 | Comp. Ex. 1 | 85.5 | 74.5 | 87 | X | X | X | Δ | X |
| Comp. Ex. 11 | Comp. Ex. 2 | 88.0 | 68.5 | 78 | Δ | Δ | ◯ | ◯ | Δ |
| Comp. Ex. 12 | Comp. Ex. 3 | 84.5 | 75.5 | 89 | X | X | Δ | Δ | Δ |
| Comp. Ex. 13 | Comp. Ex. 4 | 78.5 | 73.5 | 94 | X | X | X | X | X |

As is apparent from the results of Table 4, the paint resin compositions blended with the surface-treated calcium carbonates of the present invention is not only high in thixotropy judging from excellent anti-sagging property, but excellent in gloss retention after water resistance test, from which it is understood that those compositions have high strength in the coating film as well as high durability.

EXAMPLES 28 TO 34, COMPARATIVE EXAMPLES 14 TO 17

Using the surface-treated calcium carbonates synthesized by the above-mentioned Examples 1 to 7 and Comparative Examples 1 to 4, plastisol resin compositions were prepared according to the following compositions.

(Composition)

| | |
|---|---|
| Surface-treated calcium carbonate | 300 parts |
| Acrylic resin (Zeon Acrylic Resin F345 manufactured by Shin Daiichi Enbi Kogyo K. K.) | 250 parts |
| Block urethane resin curing agent (manufactured by Mitsui Takeda Chemicals) | 120 parts |
| DINP | 500 parts |
| Terpene | 80 parts |
| Urethane curing agent (manufactured by Mitsui Takeda Chemicals) | 6 parts |

The above-mentioned components were kneaded at ordinary room temperature by the use of a 5 L-universal stirrer (manufactured by Dulton) until grains disappear to thereby prepare acrylic plastisol compositions. The obtained compositions were tested and evaluated for various characteristics by the following methods. The results are shown in Table 5.

(Viscosity•Thixotropy)

The viscosity of the obtained acrylic plastisol compositions was measured at 2 rpm and 20 rpm, respectively by the use of a BH viscometer and thixotropy was represented by a value obtained by viscosity at 2 rpm/viscosity at 20 rpm.

(Chipping Resistance)

Each of the obtained acrylic plastisol compositions was electrodeposited and stoved to thus obtain an electrodeposited plate. The obtained electrodeposited plate was set at an 60° with the coating surface up. On the coated surface, a pipe with a length of 2 m was locating perpendicularly and an M-4 nut was dropped down to the coated surface according to JIS nut-drop test. The chipping resistance was represented by the accumulated weight of but until the coating surface was broken to expose a base.

As is apparent from the results of Table 5, it is confirmed that the plastisol resin compositions blended with the surface-treated calcium carbonates of the present invention were clearly improved in viscosity and strength (chipping resistance).

EXAMPLES 35 TO 46, COMPARATIVE EXAMPLES 18 TO 21

Using the surface-treated calcium carbonates synthesized by the above-mentioned Examples 1 to 11, 13 and Comparative Examples 1 to 4, curable resin compositions were prepared according to the following compositions.

(Composition)

| | |
|---|---|
| (Base material) | |
| Surface-treated calcium carbonate | 400 parts |
| Resin (MS polymer S810 manufacture by Kaneka Corporation) | 500 parts |
| DOP | 345 parts |
| Heavy calcium carbonate (Super S manufactured by Maruo Calcium Co., Ltd.) | 400 parts |
| Aminosilane | 5 parts |
| (Curing agent) | |
| Colloidal calcium carbonate (Calfine 200M manufactured by Maruo Calcium Co., Ltd.) | 20 parts |
| Tin octylate | 6 parts |
| Laurylamine | 1 part |
| DOP | 11 parts |
| Heavy calcium carbonate (Super SSS manufactured by Maruo Calcium Co., Ltd.) | 28 parts |

The above-mentioned components were kneaded thoroughly by the use of a 5 L-universal stirrer (manufactured by Dulton) until grains disappear to thereby prepare the base material and the curing agent. The obtained compositions were tested and evaluated for various characteristics by the following methods. The results are shown in Table 6.

(Viscosity•Thixotropy)

The viscosity of the obtained base material of the curable resin composition was measured at 1 rpm and 10 rpm, respectively by the use of a BH viscometer and thixotropy was represented by a value obtained by viscosity at 1 rpm/viscosity at 10 rpm.

(Storage Stability Test)

The viscosity of the base material of the above-mentioned curable resin compositions after those were left to stand for 2 weeks in a thermostatic chamber controlled at 20° C.

TABLE 5

| | | Acrylicsol viscosity | | | |
|---|---|---|---|---|---|
| | Surface-treated calcium carbonate | 2 rpm (Pa · s) | 20 rpm (Pa · s) | Thixotropy 2 rpm/20 rpm | Chipping resistance (g) |
| Example 28 | Example 1 | 650 | 95 | 6.8 | 82 |
| Example 29 | Example 2 | 680 | 105 | 6.5 | 86 |
| Example 30 | Example 3 | 770 | 115 | 6.7 | 90 |
| Example 31 | Example 4 | 620 | 90 | 6.9 | 88 |
| Example 32 | Example 5 | 550 | 105 | 5.2 | 68 |
| Example 33 | Example 6 | 920 | 145 | 6.3 | 76 |
| Example 34 | Example 7 | 540 | 85 | 6.4 | 72 |
| Comp. Ex. 14 | Comp. Ex. 1 | 330 | 60 | 5.5 | 48 |
| Comp. Ex. 15 | Comp. Ex. 2 | 180 | 40 | 4.5 | 34 |
| Comp. Ex. 16 | Comp. Ex. 3 | 280 | 55 | 5.1 | 42 |
| Comp. Ex. 17 | Comp. Ex. 4 | 140 | 35 | 4.0 | 32 |

(H Type Tensile Strength and Elongation Test)

Each of curable resin compositions in which the base material: the curing agent is 10:1 was mixed and defoamed thoroughly, and H type specimens were prepared and tested according to JIS A5757 6.11 tensile stress and elongation test.

(Adhesion Test)

In the above-mentioned H type tensile strength test, adhesion was evaluated according to the following criteria.
○: Good (Material breakage occurs.)
Δ: Ordinary (Interfacial peeling not only occurs slightly, but material breakage occurs.)
X: Bad (Interfacial peeling occurs.)

(H Type Tensile Strength Test and Adhesion Test after Conformability Test)

In the above-mentioned H type tensile strength test, H type tensile strength (residual stress) and adhesion were measured in the same methods after the cured body was set for one week with being stretched 50%, by the results of which the joint conformability of a sealing material was evaluated.

As is apparent from the results of Tables 6 and 7, it is confirmed that the curable resin compositions blended with the surface-treated calcium carbonates of the present invention, which are represented by a sealant and an adhesive, are excellent in adhesion judging from high breaking strength, and that their effects are maintained even after the conformability test.

In addition, it is confirmed that the storage stability is superior by reducing the amount of alkali metals contained in calcium carbonate by washing with water, as shown by Examples 4 and 8.

EXAMPLE 47, COMPARATIVE EXAMPLE 22

Using the surface-treated calcium carbonates synthesized by the above-mentioned Example 12 and Comparative Example 5, ink resin compositions were prepared according to the following composition. The evaluation results of the obtained ink resin compositions are shown in Table 8.

TABLE 6

|  | Surface-treated calcium carbonate | Viscosity of base material immediately after preparation | | | Viscosity of base material after 20° C. × 2 weeks | | |
| --- | --- | --- | --- | --- | --- | --- | --- |
|  |  | 1 rpm (Pa · s) | 10 rpm (Pa · s) | Thixotropy 1 rpm/10 rpm | 1 rpm (Pa · s) | 10 rpm (Pa · s) | Thixotropy 1 rpm/10 rpm |
| Example 35 | Example 1 | 4400 | 640 | 6.9 | 5160 | 760 | 6.8 |
| Example 36 | Example 2 | 4550 | 650 | 7.0 | 5430 | 780 | 7.0 |
| Example 37 | Example 3 | 4650 | 660 | 7.0 | 5580 | 820 | 6.8 |
| Example 38 | Example 4 | 4300 | 630 | 6.8 | 4450 | 650 | 6.8 |
| Example 39 | Example 5 | 4600 | 780 | 5.9 | 7850 | 1350 | 5.8 |
| Example 40 | Example 6 | 6490 | 980 | 6.6 | 7850 | 1180 | 6.7 |
| Example 41 | Example 7 | 3950 | 670 | 5.9 | 5150 | 950 | 5.4 |
| Example 42 | Example 8 | 4100 | 590 | 6.9 | 4250 | 630 | 6.7 |
| Example 43 | Example 9 | 4500 | 630 | 7.1 | 5450 | 770 | 7.1 |
| Example 44 | Example 10 | 3900 | 610 | 6.4 | 5120 | 830 | 6.2 |
| Example 45 | Example 11 | 4050 | 620 | 6.5 | 4890 | 770 | 6.4 |
| Example 46 | Example 13 | 4150 | 620 | 6.7 | 4520 | 710 | 6.4 |
| Comp. Ex. 18 | Comp. Ex. 1 | 1570 | 325 | 4.8 | 2040 | 390 | 5.2 |
| Comp. Ex. 19 | Comp. Ex. 2 | 1950 | 385 | 5.1 | 2450 | 510 | 4.8 |
| Comp. Ex. 20 | Comp. Ex. 3 | 2780 | 530 | 5.2 | 3890 | 740 | 5.3 |
| Comp. Ex. 21 | Comp. Ex. 4 | 820 | 170 | 4.8 | 1000 | 225 | 4.4 |

TABLE 7

|  | Surface-treated calcium carbonate | Initial properties | | | | Physical properties after conformability test | |
| --- | --- | --- | --- | --- | --- | --- | --- |
|  |  | Tensile strength at 50% stretch (N/mm$^2$) | Tensile strength at breakage (N/mm$^2$) | Elongation (%) | Adhesion | Tensile strength at breakage (N/mm$^2$) | Adhesion |
| Example 35 | Example 1 | 0.23 | 1.05 | 890 | ○ | 0.90 | Δ |
| Example 36 | Example 2 | 0.21 | 0.15 | 920 | ○ | 1.05 | Δ |
| Example 37 | Example 3 | 0.19 | 1.20 | 930 | ○ | 1.10 | Δ |
| Example 38 | Example 4 | 0.23 | 1.00 | 910 | ○ | 0.95 | Δ |
| Example 39 | Example 5 | 0.28 | 0.80 | 720 | ○ | 0.75 | Δ |
| Example 40 | Example 6 | 0.17 | 1.30 | 980 | ○ | 1.25 | Δ |
| Example 41 | Example 7 | 0.25 | 0.95 | 870 | ○ | 0.80 | Δ |
| Example 42 | Example 8 | 0.24 | 0.95 | 900 | ○ | 0.80 | Δ |
| Example 43 | Example 9 | 0.22 | 1.10 | 900 | ○ | 0.90 | Δ |
| Example 44 | Example 10 | 0.25 | 0.90 | 850 | ○ | 0.85 | Δ |
| Example 45 | Example 11 | 0.23 | 1.00 | 880 | ○ | 0.85 | ○ |
| Example 46 | Example 13 | 0.23 | 1.00 | 880 | ○ | 0.85 | Δ |
| Comp. Ex. 18 | Comp. Ex. 1 | 0.48 | 0.55 | 430 | X | 0.38 | X |
| Comp. Ex. 19 | Comp. Ex. 2 | 0.33 | 0.60 | 780 | Δ | 0.45 | X |
| Comp. Ex. 20 | Comp. Ex. 3 | 0.28 | 0.75 | 640 | Δ | 0.62 | X |
| Comp. Ex. 21 | Comp. Ex. 4 | 0.13 | 0.85 | 550 | X | 0.55 | X |

(Composition)

| | |
|---|---|
| Surface-treated calcium carbonate | 25 parts |
| Phenol resin modified with rosin | 35 parts |
| Linseed oil | 20 parts |
| Refined gas oil | 17 parts |
| Dryer | 3 parts |

The above-mentioned components were kneaded thoroughly by the use of a triple-roller kneader (manufactured by Inoue Seisakusho) until the grains were reduced to 5 microns or below measured by a grind-meter, to thereby prepare ink resin compositions.

(Viscosity•Thixotropy)

The viscosity of the obtained ink resin composition was measured at 1 rpm and 10 rpm, respectively by the use of a BH viscometer and thixotropy was represented by a value obtained by viscosity at 1 rpm/viscosity at 10 rpm.

(Transparency)

Each of the ink resin compositions prepared above was applied to one side of a glass plate by the use of an applicator of 25 microns and dried at ordinary room temperature for 24 hours, and light transmittance at 550 μm was measured by the use of a photoelectric spectrophotometer (manufactured by Shimadzu Corp.)

(Gloss)

Each of the ink resin compositions was applied in the same manner as above, dried at ordinary room temperature for 24 hours, and gloss at 60° was measured by the use of Murakami gloss meter.

(Abrasion Resistance Test)

Each of the ink resin compositions was applied to one side of a black measuring paper by the use of an applicator of 25 microns, dried at ordinary room temperature for 24 hours, and abrasion resistance was measured by the use of an S type abrasion machine (Sutherland's Rub Tester) and evaluated according to the following criteria.

○: Good (No abrasion was observed.)

Δ: Ordinary (Abrasion was somewhat observed.)

X: Bad (Abrasion was considerably observed.)

(Adhesion)

After the application and drying in the same manner as above, Cellotape [(registered trademark) CT 405 A-18 manufactured by Nichiban Co., Ltd.] was bonded to the surface of the coating film and peeled off rapidly, and the condition of peeling of ink was evaluated by the following criteria.

◎: Extremely good (No peeling was observed.)

○: Good (Peeling was hardly observed.)

Δ: Ordinary (Peeling was slightly observed.)

X: Bad (Peeling was considerably observed.)

(Scratch Resistance)

After the application and drying in the same manner as above, scratch test was carried out by the use of a scratch tester (manufactured by Toyo Seiki Seisakusho) and the condition was evaluated according to the following criteria.

◎: Extremely good (No scratches are observed.)

○: Good (Scratches are hardly observed.)

Δ: Ordinary (Scratches are somewhat observed.)

X: Bad (Scratches are considerably observed.)

TABLE 8

| | | Viscosity | | | | | | | |
|---|---|---|---|---|---|---|---|---|---|
| | Surface-treated calcium carbonate | 1 rpm (Pa·s) | 10 rpm (Pa·s) | Thixotropy 1 rpm/10 rpm | Transparency | 60° gloss | Abrasion resistance | Adhesion | Scratch resistance |
| Example 47 | Example 12 | 1380 | 410 | 3.4 | 88.5 | 87.0 | ○ | ◎ | ○ |
| Comp. Ex. 22 | Comp. Ex. 5 | 560 | 230 | 2.4 | 72.0 | 73.5 | X | Δ | X |

As is apparent from the results of Table 8, it is understood that the ink resin compositions blended with the surface-treated calcium carbonates of the present invention are excellent in effects of affording viscosity and thixotropy, but high in gloss and transparency. It is further understood that those are excellent in adhesion to an object to be adhered as well as abrasion resistance, scratch resistance and strength of the coating film. In consequence, it is possible to reduce the added amount of calcium carbonate as compared with the conventional one so that ink characteristics may be effectively stabilized.

INDUSTRIAL APPLICABILITY

As stated above, the calcium carbonate which are surface-treated with the organic surface treating agents and have the specific particle characteristics are particularly suitable for resins, and it is possible to improve adhesion of resin compositions blended therewith to a subject to be adhered and to form a rigid coating film when blended into resins.

The surface-treated calcium carbonate of the present invention is capable of providing resin compositions not only preventing strength at a weldline portion from lowering, but having excellent impact strength when added to molding resins, resin compositions having excellent anti-sagging property and high by strengthened coating film when added to paints and inks, resin compositions having excellent viscosity, thixotropy and chipping resistance when added to plastisol resins, and resin compositions having excellent viscosity, thixotropy and joint conformability when added to curable resins represented by sealants and adhesives.

What is claimed is:

1. A surface-treated calcium carbonate that has been treated with at least one hydrophobic organic surface treating agent selected from the group consisting of saturated fatty acids, unsaturated fatty acids, alicyclic carboxylic acids, resin acids, modified resins, alkali metal salts thereof, alkaline earth metal salts thereof, ammonium salts thereof and amine salts thereof, wherein the surface-treated calcium carbonate satisfies the following formulae (a), (b), (c) and (d):

$20 \leq Sw \leq 200$ (m$^2$/g)      (a)

$1.0 \leq As \leq 7.5$ (mg/m$^2$)      (b)

$0.003 \leq Dxp \leq 0.03$ (µm)      (c)

$50 \leq Dyp/Dxp \leq 180$,      (d)

wherein:
  Sw: BET specific surface area determined by nitrogen adsorption method (m$^2$/g);
  As: reduced heat amount per unit specific surface area calculated by the following equation (mg/m$^2$):
    (reduced heat amount mg per 1 g of the surface-treated calcium carbonate at 200° C. to 500° C.)/Sw;
  Dxp: average pore diameter (µm) at which an increased amount of mercury penetration [integration of increased amounts of pore volume/log (average pore diameter)] reaches the maximum value (Dys) in distribution of pore in the pore range of 0.001 to 0.1 µm in a method of mercury penetration;
  Dyp: maximum value of an increased amount of mercury penetration (ml/g); and
  Dyp/Dxp: amount of an average pore diameter.

2. A surface-treated calcium carbonate that is treated with at least one organic surface treating agent selected from the group consisting of saturated fatty acids, unsaturated fatty acids, alicyclic carboxylic acids, resin acids, modified resins, alkali metal salts thereof, alkaline earth metal salts thereof, ammonium salts thereof and amine salts thereof, wherein the surface-treated calcium carbonate satisfies the following formulae (a), (b), (c), (d), (e) and (f):

$20 \leq Sw \leq 200$ (m$^2$/g)      (a)

$1.0 \leq As \leq 7.5$ (mg/m$^2$)      (b)

$0.003 \leq Dxp \leq 0.03$ (µm)      (c)

$50 \leq Dyp/Dxp \leq 180$,      (d)

$0.03 \leq Dxs \leq 1$ (µm)      (e)

$Dys \leq 30$ (% by weight),      (f)

wherein:
  Sw: BET specific surface area determined by nitrogen adsorption method (m$^2$/g);
  As: reduced heat amount per unit specific surface area calculated by the following equation (mg/m$^2$):
    (reduced heat amount mg per 1 g of the surface-treated calcium carbonate at 200° C. to 500° C.)/Sw;
  Dxp: average pore diameter (µm) at which an increased amount of mercury penetration [integration of increased amounts of pore volume/log (average pore diameter)] reaches the maximum value (Dys) in distribution of pore in the pore range of 0.001 to 0.1 µm in a method of mercury penetration;
  Dyp: maximum value of an increased amount of mercury penetration (ml/g); and
  Dyp/Dxp: amount of an average pore diameter;
  Dxs: average particle size (µm) at 50% accumulated weight from a larger particle side in particle size distribution measured by a laser diffraction system (manufactured by Shimadzu Corp.: SALD-2000); and
  Dys: accumulated weight of particle sizes of more than 3 µm in the above particle size distribution (% by weight).

3. The surface-treated calcium carbonate according to any one of claims 1 and 2, which satisfies the following formulae (g) to (j):

$0.005 \leq Dxp \leq 0.025$ (µm)      (g)

$60 \leq Dyp/Dx \leq 150$,      (h)

$0.05 \leq Dxs \leq 0.8$ (µm)      (i)

$Dys \leq 25$ (% by weight)      (j).

4. The surface-treated calcium carbonate according to any one of claims 1 and 2, which satisfies the following formula (k):

$0.1 \leq Sw \cdot Dxp \leq 1.5$      (k).

5. The surface-treated calcium carbonate according to any one of claims 1 and 2, wherein alkali metal salts contained in the surface-treated calcium carbonate satisfy the following formula (1):

$0.03 \leq Is \leq 3$ (µmol/m$^2$)      (1)

wherein:
  Is: content of alkali metals per unit specific surface area calculated by the following equation: {metal content per 1 g of calcium carbonate (mmol/g)}/Sw (m$^2$/g).

6. The surface-treated calcium carbonate according to any one of claims 1 and 2, wherein a calcium carbonate slurry before carrying out surface treatment with an organic surface treating agent (after maturation) satisfies the following formula (m):

$0.05 \leq Dx \leq 0.40$ (µm)      (m)

wherein:
  Dx: particle size (µm) at 50% accumulated weight calculated from a larger particle side in particle size distribution measured by a centrifugal-type particle size distribution analyzer (manufactured by Shimadzu Corp.: SA-CP4).

7. The surface-treated calcium carbonate according to any one of claims 1 and 2, wherein the organic surface treating agent is at least one selected from the group consisting of saturated fatty acids, unsaturated fatty acids, resin acids, sulfonic acids, alkali metal salts thereof, alkaline earth metal salts thereof, ammonium salts thereof, amine salts thereof, cationic surfactants, anionic surfactants, and nonionic surfactants.

8. A method for producing a surface-treated calcium carbonate defined in any of claims 1 and 2, comprising the steps of:
  adding 0.5 to 15% by weight of a substance which coordinates with a metal ion to form a complex into a slurry of calcium hydroxide;
  blowing-in carbon dioxide gas to synthesize calcium carbonate by carbonation reaction;
  adjusting a concentration of the calcium carbonate to 2.4 to 13.0% by weight to conduct maturation; and
  surface-treating the calcium carbonate thus obtained with an organic surface treating agent.

9. A resin composition comprising the surface-treated calcium carbonate according to any one of claims 1 and 2 and a resin.

10. The resin composition according to claim 9, wherein the resin is a resin for molding.

11. The resin composition according to claim 9, wherein the resin is a resin for paint.

12. The resin composition according to claim 9, wherein the resin is a resin for plastisol.

13. The resin composition according to claim 9, wherein the resin is a resin for ink.

14. The resin composition according to claim 9, wherein the resin is a resin for sealant.

15. The resin composition according to claim 9, wherein the resin is a resin for adhesive.

16. The resin composition according to claim 9, wherein a blending amount of the surface-treated calcium carbonate is 1 to 100 parts by weight based on 100 parts by weight of resin.

* * * * *